Feb. 22, 1966   L. J. SCHILLING ETAL   3,236,208
MILKER PULSATOR WITH ADJUSTABLE TIMER CONTROL MEANS
Filed Aug. 6, 1962   3 Sheets-Sheet 1
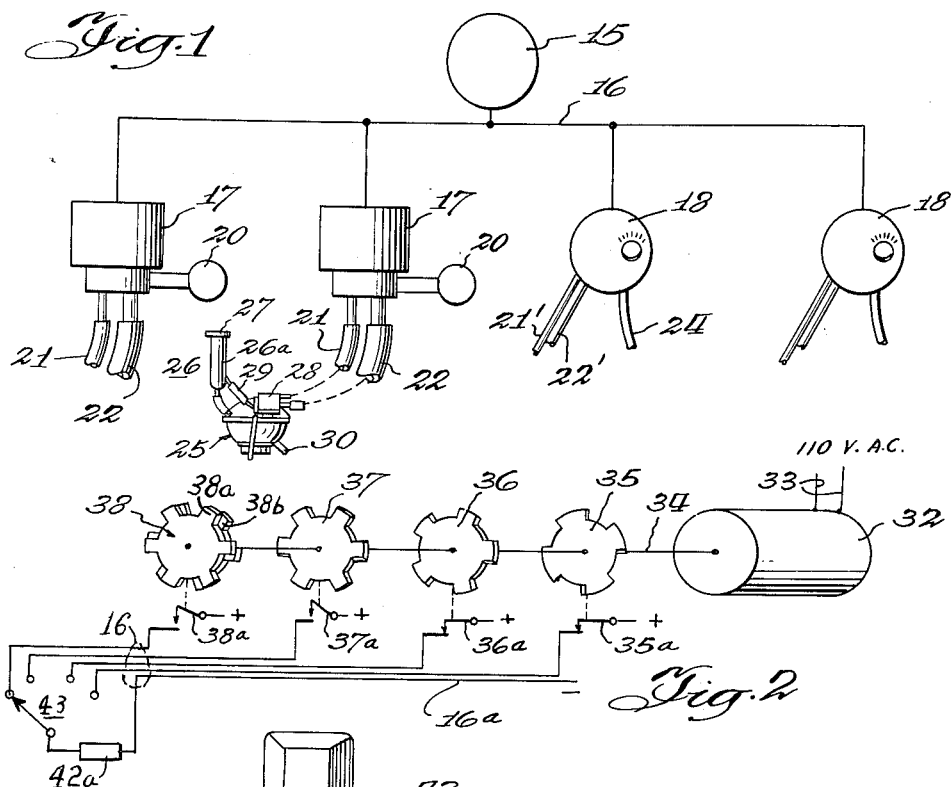
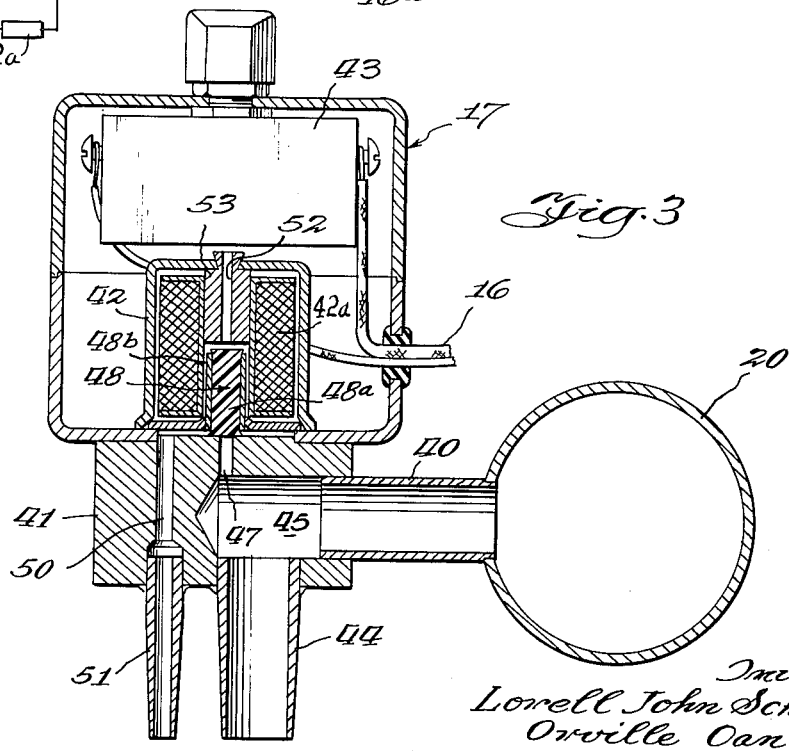
Inventors
Lowell John Schilling
Orville Oanes
By Hofgren, Brady, Wegner, Allen & Stellman
Attorneys

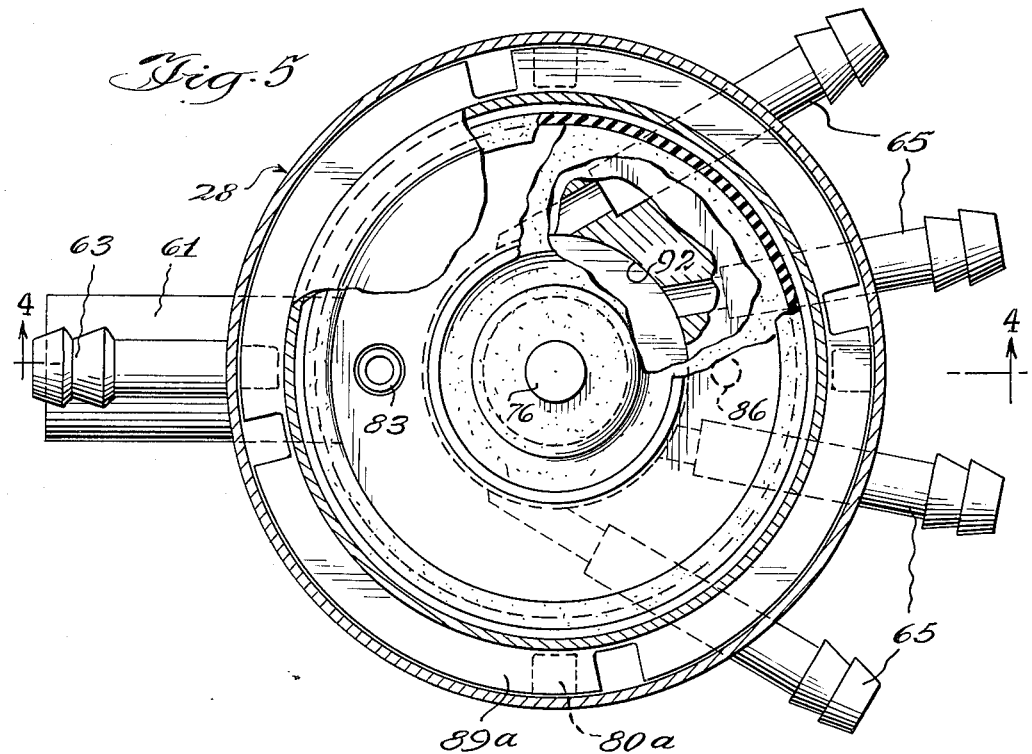
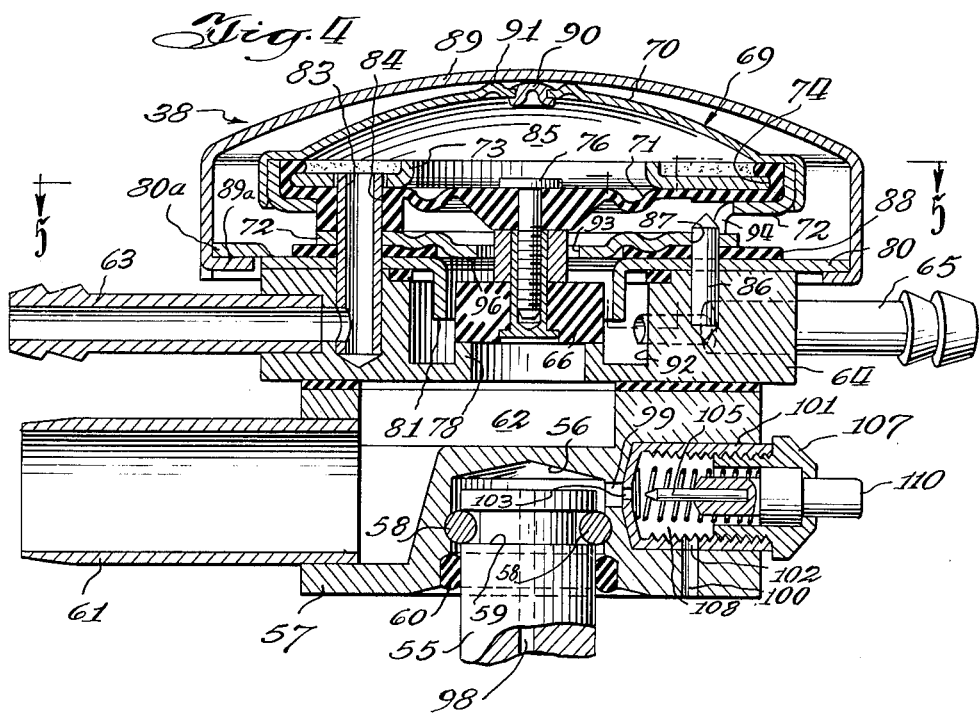

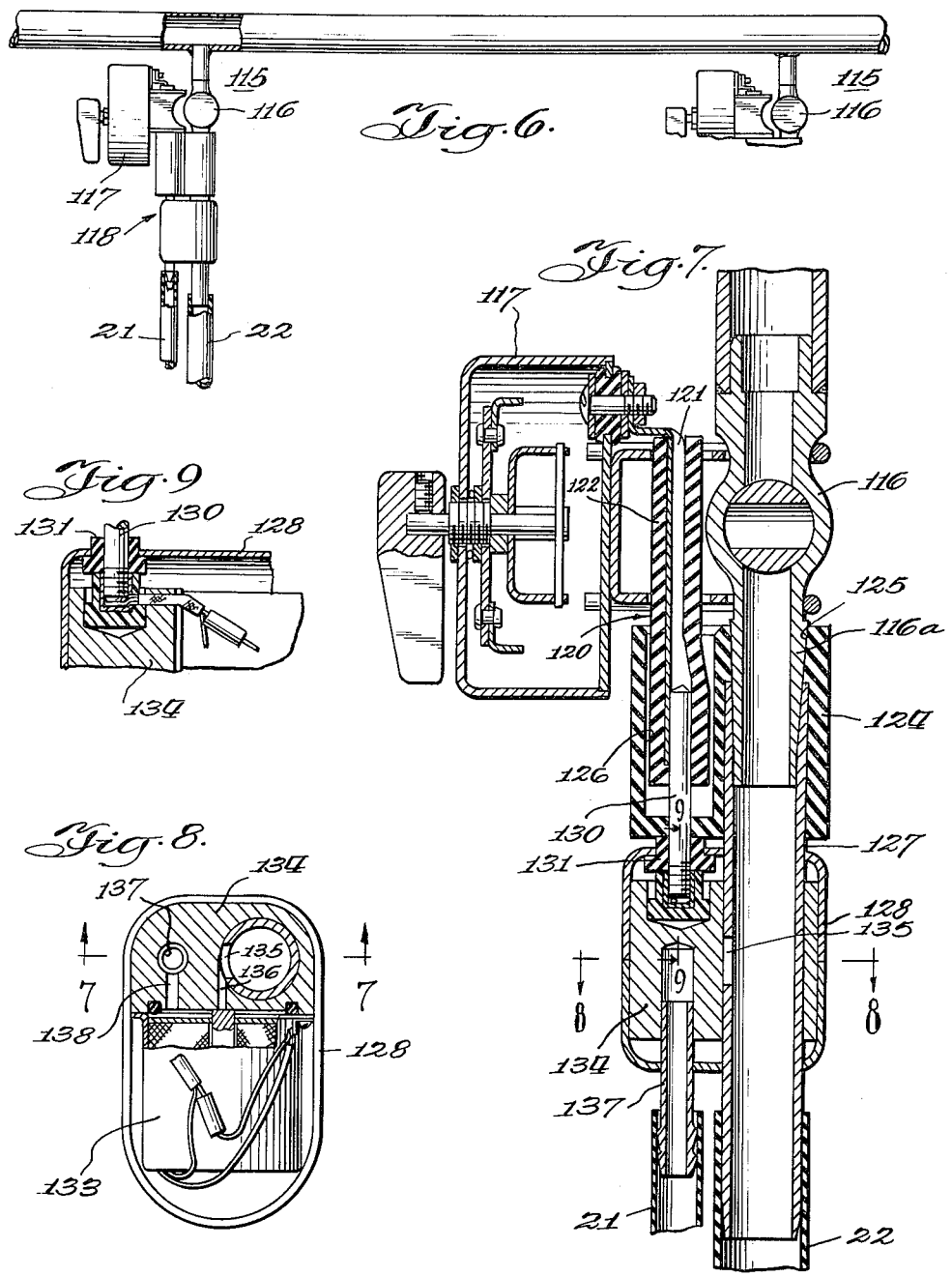

3,236,208
MILKER PULSATOR WITH ADJUSTABLE TIMER CONTROL MEANS
Lorell John Schilling and Orville Oanes, Galesville, Wis., assignors to Schilling Electric Company, a corporation of Wisconsin
Filed Aug. 6, 1962, Ser. No. 214,994
1 Claim. (Cl. 119—14.28)

This invention is concerned with a pulsator for a milker and more particularly with an electrically controlled vacuum operated pulsator.

A milker pulsator is a timed valving device which controls the ultimate application of vacuum and atmospheric air to a milker unit. In a specific milker commonly used in the United States, the milker includes four teat cups each comprising a rigid outer shell and a flexible inflation or liner. A continuous vacuum is established in the interior of the inflation which is applied to the cow's teat. The space between the inflation and shell is alternately evacuated, opening the inflation or drawing it away from the teat, and vented to atmosphere, collapsing the inflation about the teat providing a rest period and massaging the teat wall.

A pulsator widely used comprises a control valve that alternately connects the teat cup shells with the source of vacuum or atmosphere, and a timing valve which establishes the position of the control valve. Movement of the timing valve is controlled by a small bleeder passage with a needle valve control. In most instances, the pulsator is designed to provide equal periods of vacuum and air in the teat cup shells. The rate of operation of the pulsator may be varied by a needle valve in an air bleeder passage associated with the timing portion of the pulsator. Further details may be found in Thomas Patent 2,646,058, issued July 21, 1953.

It has been determined that different cows respond more readily to different milking rates and in some cases to unequal active and rest periods. For example, a hard milker will deliver more milk with a slower milking rate than with a fast one. An easy milker can be milked out more rapidly by using a faster milking rate and by increasing the ratio of the active to the rest period, without risk of damage to the animal. It is impractical, however, to adjust the rate of operation of a pulsator of the type illustrated in the Thomas patent, for the different characteristics of the cows of a herd.

An important object of this invention is the provision of an improved electrically controlled pulsator which makes available to the operator several different milking rates and also provides for adjustment of the timing ratio of each pulsator cycle.

One feature of the invention is the provision in a milker of pulsator means including a source of continuous vacuum, a source of alternating vacuum and air, a valve at the milker having a control portion and a valved passage responsive thereto, means connecting the valved passage with the source of continuous vacuum and means connecting the control portion of the valve with the source of alternating vacuum and air to operate the valve in the passage.

Another feature is the provision of a milking installation with a plurality of milking stations, an electric pulsator control having a plurality of timed, electric control signals, means at each milking station for selecting the desired pulsator control signal, and pulsator means operably connected with the selected control signal to operate the milker at that station.

A further feature is that the pulsator valve includes a valve body with a flow passage therethrough, a control portion having a diaphragm forming one wall thereof and a valve member mounted on said diaphragm.

Still another feature is that the diaphragm assembly is readily removable from the valve body.

Yet another feature of the invention is the provision in a multi-position milker installation of a pulsator rate selector at each milking position together with a pulsator control means readily connectible with the rate selector.

Another feature of the invention is the provision of the pulsator valve having an air bleeder inlet passage to the milker with an orifice member therein, together with means for cleaning said orifice.

Further features and advantages of the invention will be readily apparent from the following specification and from the drawings in which:

FIGURE 1 is a diagrammatic illustration of a system embodying the invention;

FIGURE 2 is a schematic illustration of a pulsator timer;

FIGURE 3 is an enlarged vertical section through the center of an electrically operated control valve used in the system;

FIGURE 4 is a vertical section through the pulsator valve of the invention taken generally along line 4—4 of FIGURE 5;

FIGURE 5 is a broken section taken generally along line 5—5 of FIGURE 4;

FIGURE 6 is a fragmentary illustration of a stanchion barn installation;

FIGURE 7 is a longitudinal section through a control unit taken generally along the line 7—7 of FIGURE 8;

FIGURE 8 is a transverse section taken along line 8—8 of FIGURE 7; and

FIGURE 9 is a fragmentary sectional view taken along line 9—9 of FIGURE 7.

Modern milking installations are generally one of two basic types. In a stanchion barn the cows are held in the stalls and the milker units are carried from animal to animal at milking time. Where bucket milkers are used, a single vacuum line extends through the stall area, generally above the heads of the stalls. The buckets of milk are emptied into cans or a tank between each cow. A carry-away milking system may also be used in a stanchion barn, if a milk line is extended through the milking area. In a parlor milker, the milking equipment stays at the stall or pair of stalls with which it is used. The cows themselves come to the milking stall or station. The problems of providing centrally controlled electrical pulsations for milking systems are somewhat different depending on the nature of the milker installation.

Turning now to the drawings, and more particularly to FIGURE 1, a timer 15 provides a plurality of pulsator control signals connected through a cable 16 with pulsator control units 17 or 18 which are located at milking stations throughout the milking area, as the stalls of a milking parlor. Briefly, pulsator selectors 17 are connected with a source of vacuum as pipeline 20 and incorporate an electrically controlled valve, responsive to a selected signal from timer 15, providing alternate vacuum and atmospheric pressure in a control hose 21. A continuous vacuum from vacuum line 20 is provided in hose 22. Both hoses 21 and 22 are connected with a pulsator valve on the milker unit, as will appear. Control units 18 are of the type more fully disclosed in Schilling et al. application, Serial No. 166,129, filed January 15, 1962, assigned to the assignee of this invention, and also incorporate an electrically controlled valve responsive to the selected timer signal. The hose 24 is connected with a vacuum line, as 20, hose 21' provides a valved alternate vacuum and atmospheric pressure and hose 22' provides continuous vacuum.

A milker unit 25 illustrates diagrammatically the desired connections. A teat cup assembly 26 (of which there are four) includes a rigid outer shell 26a having a flexible inner liner or inflation 27 connected with the nipple on the lid of the milker. The pulsator control valve 28, mounted on the lid, is connected with control hose 21 and vacuum hose 22. The alternate vacuum and air are connected from pulsator 28 through hose 29 to the teat cup shell 26a. A milk hose 30 is connected with an evacuated milk line or with a suitable evacuated milk receiver.

Pulsator timer 15 is illustrated schematically in FIGURE 2. A motor 32 is connected through leads 33 with a suitable electrical source, as 110 volts, A.C., and drives a shaft 34 carrying a series of timer cams 35, 36, 37 and 38. Each of the timer cams has associated therewith a switch as 35a, 36a, 37a and 38a, respectively. The switches are closed and opened alternately by the associated motor driven cam to provide timing pulses at different rates. For example, timing cam 35 might provide a control rate of 44 cycles per minute, cam 36 a rate of 55 cycles per minute and cam 37 a rate of 66 cycles per minute. Cam 38 has six steps as does cam 37, but is made of two portions 38b, 38c which are angularly adjustable with respect to each other so that the width of the teeth and the notches between them may be varied. This permits the establishment of an increased active milking period. Cable 16 carries wires from each of the switches and a common return wire 16a throughout the milking area.

As a milker apparatus 25 is attached to an animal to be milked, the operator sets pulsator control unit 17 for the desired pulsator speed to milk the cow. In the control unit 17 a solenoid valve is actuated by the timing pulses from the timer 15 to provide alternate air and vacuum in control hose 21. This control vacuum is applied to pulsator 28 where it actuates a valve that alternately applies vacuum and air to the teat cup shell 26a of the milker. The construction and operation of these valves will be described below.

Turning now to FIGURE 3, the construction of pulsator selector 17 is illustrated. A nipple 40 is connected to vacuum pipeline 20 and has mounted on the end thereof a block or base 41 carrying a solenoid valve 42 and a selector switch 43. The energizing winding of solenoid valve 42 is connected by selector switch 43 with one of the pulsator signal carrying conductors of cable 16. A vacuum nipple 44 extends downwardly from the bottom of base 41 and is connected through cavity 45 with nipple 40 and vacuum line 20. A vacuum passage 47 extends upwardly through base 41 to solenoid valve 42 and is closed by valve member 48 when the solenoid is not energized. A control passage 50 extends downwardly from the valve 42 and terminates in a nipple 51 to which control hose 21 is connected. Solenoid valve 42 includes an air inlet passage 52 extending downwardly from the top thereof through a plug 53. The valve member is a cylindrical body 48' of a resilient material as rubber, surrounded by a soft iron sleeve 48b. When the solenoid valve is energized, armature 48 is drawn upwardly, opening the connection between vacuum passage 47 and control passage 50, and closing air inlet 52. This evacuates control hose 21. When the solenoid valve is de-energized, valve member 48 drops to the position shown closing vacuum passage 47 and admitting air through passage 52, and around the valve member, to the control hose 21.

Pulsator 28 is mounted on a post 55 extending upwardly from the lid of the milker 25. The post is received in a recess 56 in the lower surface of base block 57 of the pulsator which is secured thereto by a pair of pins 58 received in a groove 59 around the post. A resilient ring 60 seals the pulsator to the post. Nipple 61 extends outwardly from the base 57 of the pulsator for connection with vacuum hose 22, establishing a continuous vacuum in the pulsator cavity 62. Nipple 63 extends outwardly from the upper portion 64 of the pulsator, for connection with vacuum control hose 21. Four nipples 65 provide for connections of the pulsator hoses 29 to the four teat cups of a milker unit. The valve member 66, between vacuum chamber 62 and nipples 65, controls the application of vacuum and air to the teat cups.

A valve control diaphragm assembly 69 is mounted on top of upper base block member 64. The diaphragm assembly includes top plate 70, which is rigid and has a generally domed shape. Diaphragm 71 extends across top plate 70 and is held in place by a bottom or mounting plate 72. An expander ring 73 is fitted into a groove 74 in the outer edge of diaphragm 71 and holds it against the telescoped flanges of top plate 70 and bottom plate 72. Valve member 66 is carried by a pin 76 extending downwardly from the center of the diaphragm. Valve member 66 seats on a raised ring 78 formed in the upper portion 64 of the base. Plate 80 mounted on the top surface of upper block portion 64 has a central opening surrounding the valve 66 with a depending skirt 81 extending downwardly around the valve member.

Control nipple 63 is connected through upper block portion 64 with a vertically extending tube 83 which projects through an opening 84 in diaphragm 71 into the control space 85 between the diaphragm and top plate 70. The diaphragm assembly 69 is positioned on the base by tube 83 and a positioning pin 86, diametrically spaced with respect to the tube, which extends through an opening 87 in bottom plate 72. A resilient washer 88 provides a seal between plate 80 and the bottom plate 72 of the diaphragm assembly. Pulsator valve cover 89 has fingers 89a which are inturned beneath camming surfaces 80a on the periphery of plate 80. Turning the cover 89 forces it downwardly holding the diaphragm assembly 70 tightly against washer 88.

A small air vent 90 is provided in top plate 70 of the diaphragm assembly. An upwardly extending ridge in the top plate prevents the cover from sealing air inlet 90.

During that portion of the operating cycle when control hose 21 is vented to atmosphere, the control chamber 85 of diaphragm assembly 69 is at atmospheric pressure and valve 66 is held on its annular seat 78 by the vacuum in chamber 62. The pulsator nipples 65 are vented to atmosphere through annular space 92 around the valve member, opening 93 in bottom plate 72, the space between diaphragm 71 and the bottom plate, and opening 94 in the bottom plate. Cover 89 is not sealed to plate 80 so that the entire space around the outside of the diaphragm assembly is at atmospheric pressure. On the alternate portion of the cycle, when control hose 21 is evacuated at control valve 17, the space 85 within diaphragm assembly 69 is evacuated. Diaphragm 71 is drawn upwardly lifting valve member 66 off its seat 78 and causing it to seat against the flat surface 96 of bottom plate 72 surrounding opening 93. With the valve in its upper position, annular space 92 is evacuated and the vacuum is transmitted directly to the teat cup shells of the milker.

The annular surface 81 which extends downwardly around valve member 66 from plate 80 channels the flow of air around the surface of the valve member tending to draw it downwardly toward its lower position. This functions as a venturi, aiding in the movement of the valve member to its lower position, contributing to the snappy action of the pulsator. As the control of the vacuum and air to the teat cups takes place at the milker, a desirable snappy inflation action is achieved. This would not be the case if the control valve 17 at the pipeline directly operated the inflations, as the long control tube 21 would have to be evacuated and filled while the inflations were expanding and collapsing. Here, the action of diaphragm 71 may lag behind that of the control valve; however, the action of the inflations themselves is snappy as the valving action takes place close to them and only the short tubes 29 and the teat cup shells are evacuated and filled as the valve operates.

In carry-away milkers, such as that shown in Merritt Patent 2,831,456, it is sometimes desirable to provide a bleeder air inlet to the evacuated milk handling portion of the system. This has the effect of inhibiting the formation of foam as the milk enters the receiving chamber. With the apparatus of FIGURE 4, milker post 55 has a passage 98 therethrough into the milker 25. Air is admitted into the space 56 around the post, through passages 99 and 100. A sleeve 101 is mounted in pulsator base 57 and has an opening 102 aligned with passage 100, and a small metering opening 103 aligned with passage 99. It sometimes happens that small bits of dirt or other foreign material are drawn into the air inlet by the flow of air therethrough. The bleeder disclosed herein includes a cleaning tool or pin 105 mounted for reciprocation in sleeve 101 and held in place by a threaded cap 107. Spring 108 holds pin 105 in the position shown. Should the air inlet be plugged, pin 105 may be moved inwardly by pressing on thumb piece 110, causing the pin to move through opening 103, cleaning it. With this arrangement the operator can clean the air inlet each time the milker is adjusted to a different cow and at other times, if necessary.

FIGURES 6 through 9 illustrate an adaptation of the invention for use in a stanchion milking system, which may utilize suspended bucket milkers or surcingle carry-away milker units as shown in the Merritt patent mentioned above. Many stanchion barns have over fifty stalls, with each pair of stalls generally constituting a milking position. A stall cock is provided on the vacuum line between the pairs of stalls. An electrically controlled pulsator system utilizing a control valve and selector switch at each milking position would be prohibitively expensive. In accordance with the embodiment of the invention illustrated in FIGURES 6 through 9, each milking position 115 is provided with a stall cock 116 on which is mounted pulsator selector switch 117. The milker unit, which may be a bucket or a carry-away unit, has a pulsator valve of the same general type illustrated in FIGURES 4 and 5 and hoses 21 and 22 for the pulsator control and vacuum, respectively. Of course, a bucket milker pulsator does not have the air inlet illustrated in FIGURE 4. The hoses 21 and 22 have a connector assembly 118 fastened to the end thereof and connectible with stall cock 116 and pulsator selector switch 117.

The structure is best seen in FIGURE 7. Stall cock 116 has a nipple end portion 116a, while selector switch 117 is provided with a female terminal 120 including a conductive strip 121 and an insulating covering 122. The connector assembly includes a rubber fitting 124 which has two openings 125 and 126. Opening 125 fits around the nipple 116a of the stall cock while opening 126 receives the insulating covering 122 for electrical connector 121. A tubular metal piece 127 is carried by connector 124 and extends into opening 125. The other end of tubular member 127 has vacuum hose 22 connected thereto. A solenoid valve housing 128 is mounted on tubular member 127. A connector pin 130 is mounted in an insulating bushing 131 and extends upwardly into connector opening 126 to be received by the female electrical connector 120. Pin 130 is connected with solenoid valve 133 mounted on a block 134 through which tube 127 passes. A port 135 in the tube connects with the passageway 136 to the solenoid valve 133. Pulsator control nipple 137 is connected with valve 133 through a passage 138. When solenoid valve 133 is energized, the valve is opened connecting pulsator control nipple 137 and hose 21 with evacuated tube 127. When the valve is not energized, the valve member seats and control hose 21 is vented to atmosphere. The pulsator operates in exactly the same fashion as that described above.

With a selector switch at each milking position in the stanchion barn, the operator need have only one connector and solenoid valve for each milker unit to be operated. The unit may readily be connected to and disconnected from the stall cock nipple and pulsator selector switch. Thus, the advantages of electrically controlled pulsation may be secured in a large stanchion barn installation, without an unnecessary investment in expensive equipment.

While we have shown and described certain embodiments of our invention, it is to be understood that it is capable of many modifications. Changes, therefore, in the construction and arrangement may be made without departing from the spirit and scope of the invention as disclosed in the appended claim.

We claim:

In a milking system: a vacuum source; a vacuum pipe line connected with said source; a source of pulsator control signals including a motor, a plurality of cams operated by said motor and switches actuated by said cams, said cams having different numbers of switch actuating portions of close the switches at differing rates, establishing a plurality of pulsator control signals having different operating periods; a cable having a plurality of conductors, one connected with each of said switches and each carrying a different pulsator control signal; means providing a plurality of milking stations adapted for connection with a milking unit, said vacuum pipe line and said cable extending to each of said milking stations; an electrically operated pulsator control valve at each of said milking stations, each of said control valves having an operating coil; and a multi-position selector switch at each of said stations and between said cable conductors and each of said operating coils, each of said switches being independently actuable for simultaneously operating a plurality of said milking stations at different pulsator control signals.

References Cited by the Examiner

UNITED STATES PATENTS

| 961,960 | 6/1910 | Hicks | 119—14.28 |
| 1,911,618 | 5/1933 | Hapgood | 137—103 X |
| 2,718,871 | 9/1955 | Robley | 119—14.28 |
| 2,775,955 | 1/1957 | Anderson | 119—14.36 |
| 2,827,920 | 3/1958 | Rawson | 137—515 |
| 2,949,883 | 9/1960 | Clegg | 119—14.01 |
| 3,122,149 | 2/1964 | Hauk et al. | 119—14.02 X |

FOREIGN PATENTS 795,702   5/1958   Great Britain.

ABRAHAM G. STONE, *Primary Examiner.*

ALDRICH F. MEDBERY, A. RUEGG, ANTONIO F. GUIDA, *Examiners.*